US010619630B2

United States Patent
Livingston, Jr. et al.

(10) Patent No.: US 10,619,630 B2
(45) Date of Patent: Apr. 14, 2020

(54) MULTI-PORT THUMB PUMP SYSTEM

(71) Applicant: Sparrow Product Development, Inc., Shingle Springs, CA (US)

(72) Inventors: Larry Leigh Livingston, Jr., Cameron Park, CA (US); Derek Carlton Westlund, Placerville, CA (US)

(73) Assignee: SPARROW PRODUCT DEVELOPMENT, INC., Shingle Springs, CA (US)

( * ) Notice: Subject to any disclaimer, the term of this patent is extended or adjusted under 35 U.S.C. 154(b) by 28 days.

(21) Appl. No.: 15/397,662

(22) Filed: Jan. 3, 2017

(65) Prior Publication Data
US 2018/0187667 A1 Jul. 5, 2018

Related U.S. Application Data

(60) Provisional application No. 62/441,914, filed on Jan. 3, 2017.

(51) Int. Cl.
*F04B 39/12* (2006.01)
*F04B 49/10* (2006.01)
*F04B 37/14* (2006.01)
*F16B 47/00* (2006.01)

(52) U.S. Cl.
CPC ............ *F04B 39/123* (2013.01); *F04B 37/14* (2013.01); *F04B 49/10* (2013.01); *F16B 47/00* (2013.01)

(58) Field of Classification Search
CPC ........ F04B 39/123; F04B 37/14; F04B 37/10; F04B 49/10; F16B 47/00
See application file for complete search history.

(56) References Cited

U.S. PATENT DOCUMENTS

| | | | | |
|---|---|---|---|---|
| 1,757,529 | A * | 5/1930 | Jones ..................... | B66C 1/0212 294/187 |
| 3,716,307 | A * | 2/1973 | Hansen ................. | B66C 1/0218 248/362 |
| 5,173,148 | A * | 12/1992 | Lisec ................... | B65G 49/061 156/356 |
| 5,184,858 | A * | 2/1993 | Arai ..................... | B65G 49/061 116/70 |
| 7,406,758 | B2 * | 8/2008 | Jones ................... | B23Q 9/0014 248/205.5 |
| 8,132,312 | B2 * | 3/2012 | Dellach .................. | F16B 47/00 29/505 |
| 9,073,275 | B2 * | 7/2015 | Ceron Garcia .. | B29D 11/00596 |
| 9,821,721 | B2 * | 11/2017 | Casagrande ............ | B60R 9/08 |
| 2013/0037766 | A1 * | 2/2013 | Liao ...................... | B25B 11/007 254/133 R |

\* cited by examiner

*Primary Examiner* — Patrick Hamo
*Assistant Examiner* — David N Brandt
(74) *Attorney, Agent, or Firm* — Manuel de la Cerra

(57) ABSTRACT

A multi-port thumb pump cylinder is disclosed. The cylinder includes a body with a body central bore with a body bore longitudinal axis running along a portion of the length of the body and defining a proximal and distal end. The body central bore receives a thumb pump piston assembly through the proximal end. The body has a vacuum manifold connected to the distal end of the body central bore. The manifold includes a suction cup vacuum port and at least one vacuum port with a molded nipple, or a connection structure to allow fittings to be attached thereto. Also disclosed is a thumb pump using the cylinder and a thumb pump system with multiple thumb pumps utilizing the cylinder.

24 Claims, 15 Drawing Sheets

(Section A-A)
Prior Art

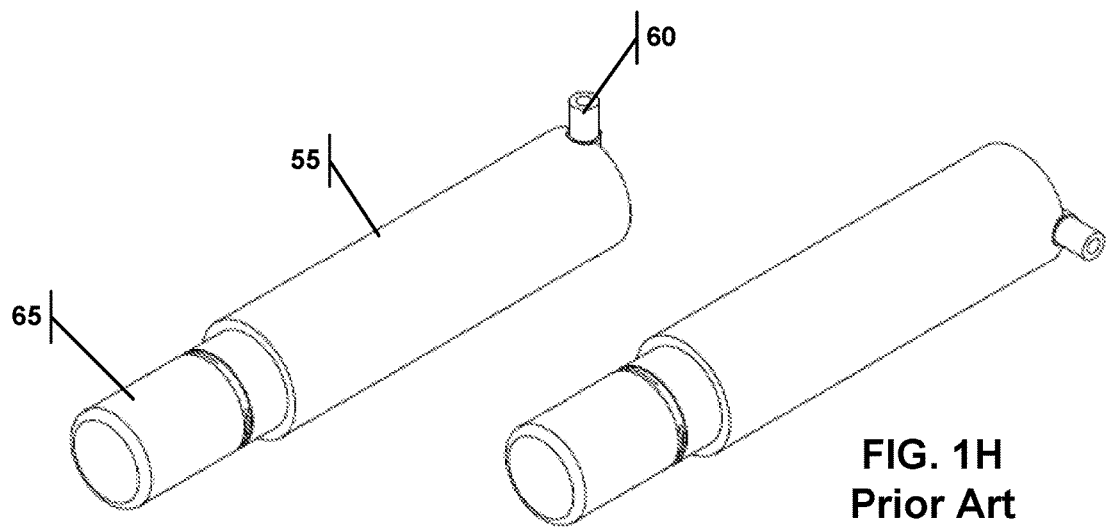
FIG. 1G
Prior Art
FIG. 1H
Prior Art
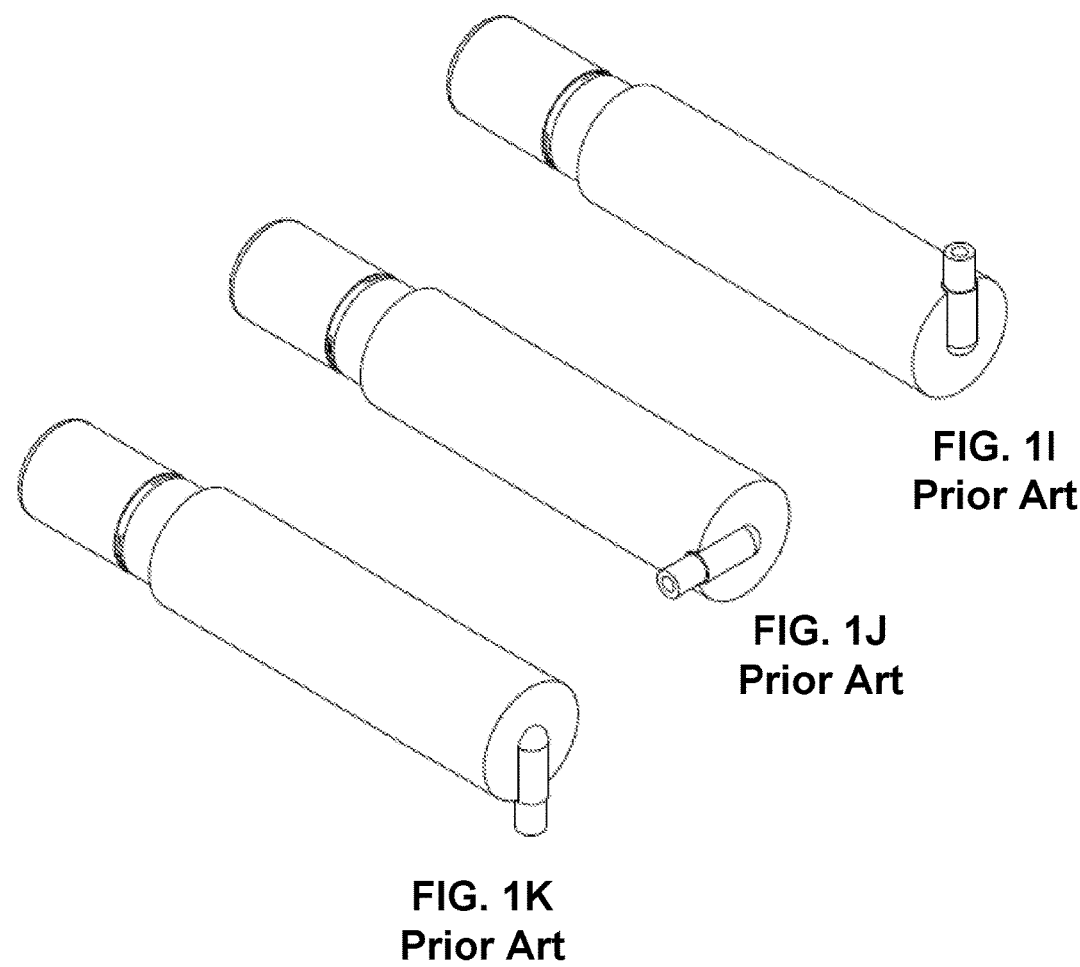
FIG. 1I
Prior Art
FIG. 1J
Prior Art
FIG. 1K
Prior Art (Section A-A)

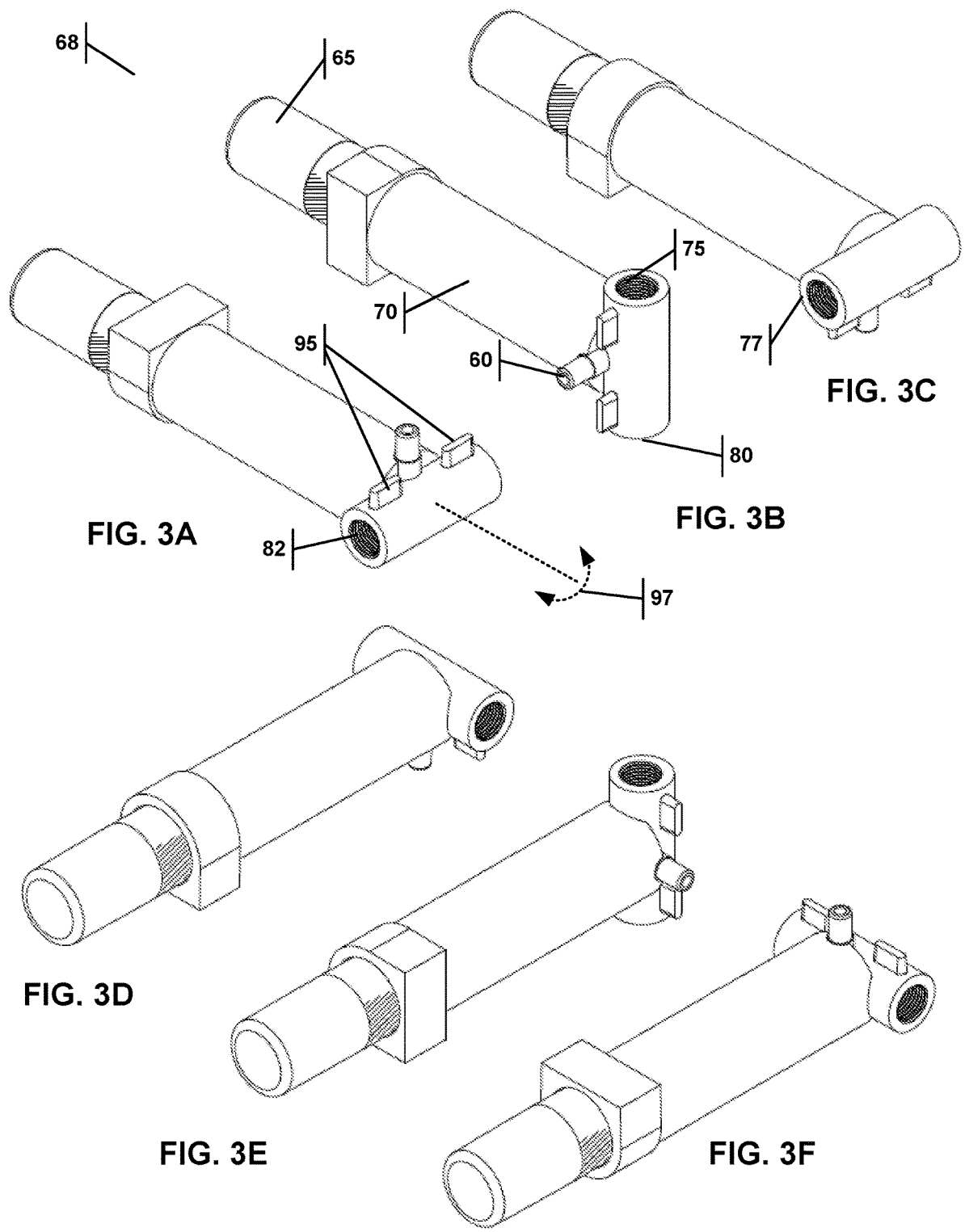

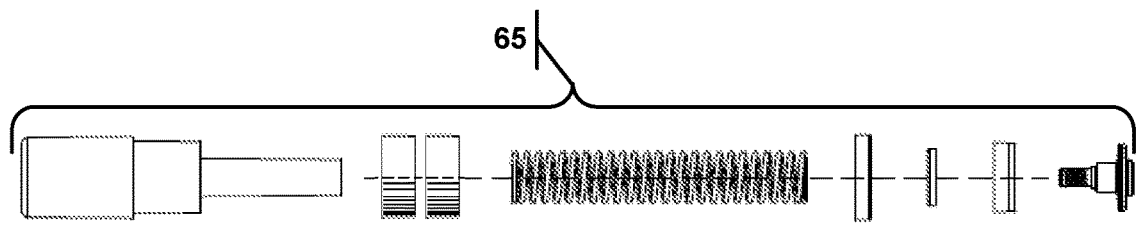
FIG. 5A
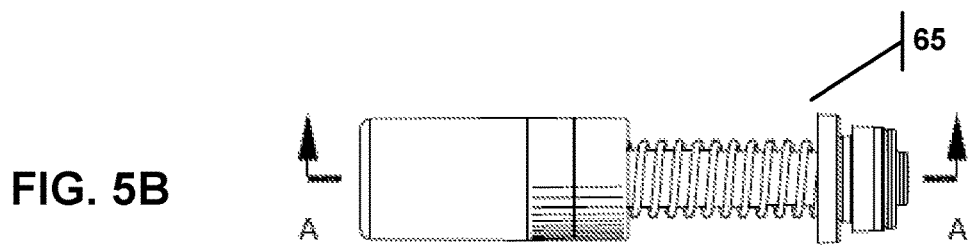
FIG. 5B
FIG. 5C
(Section A-A)
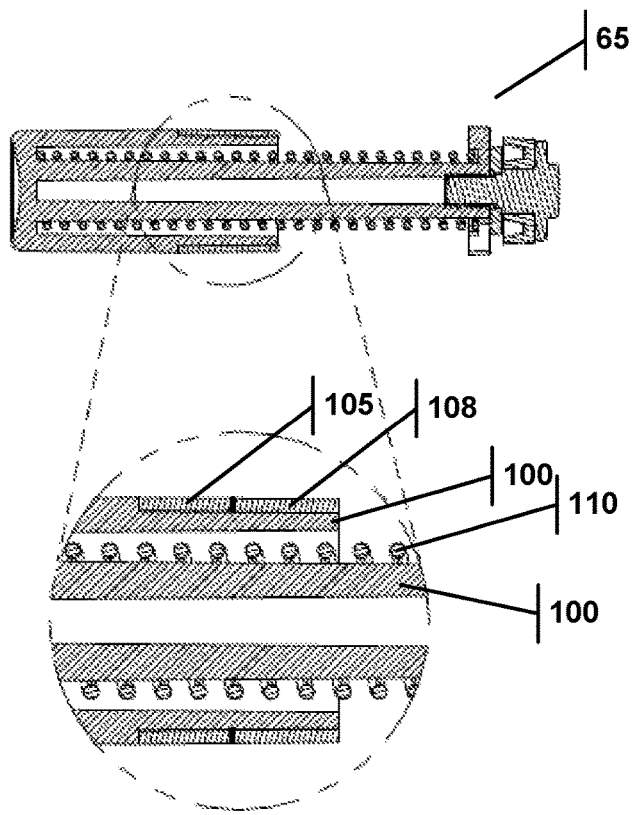
FIG. 5D

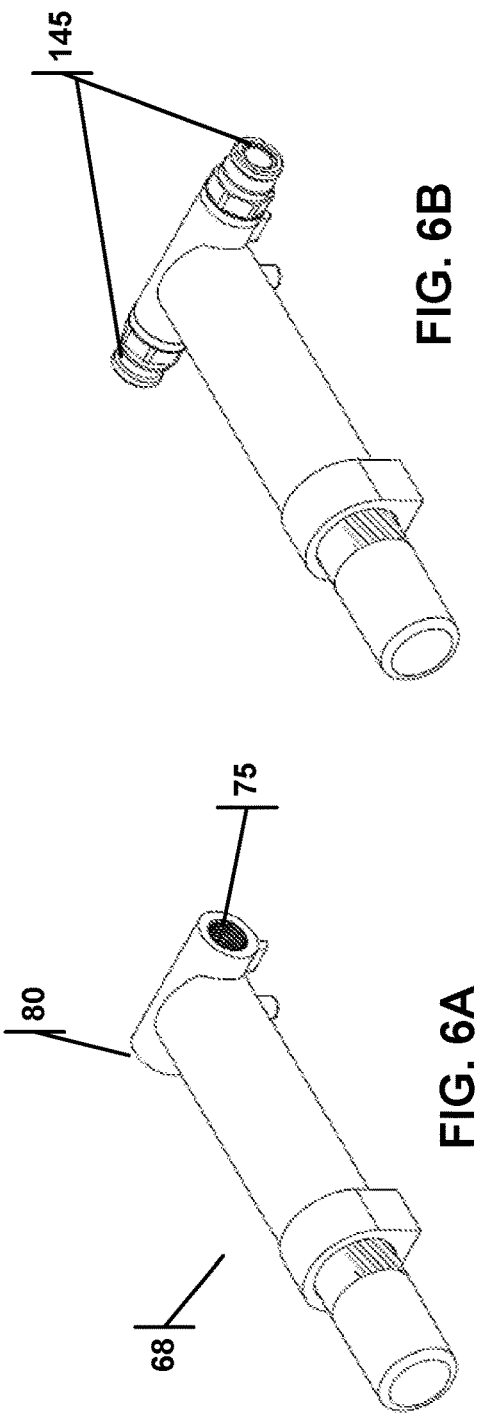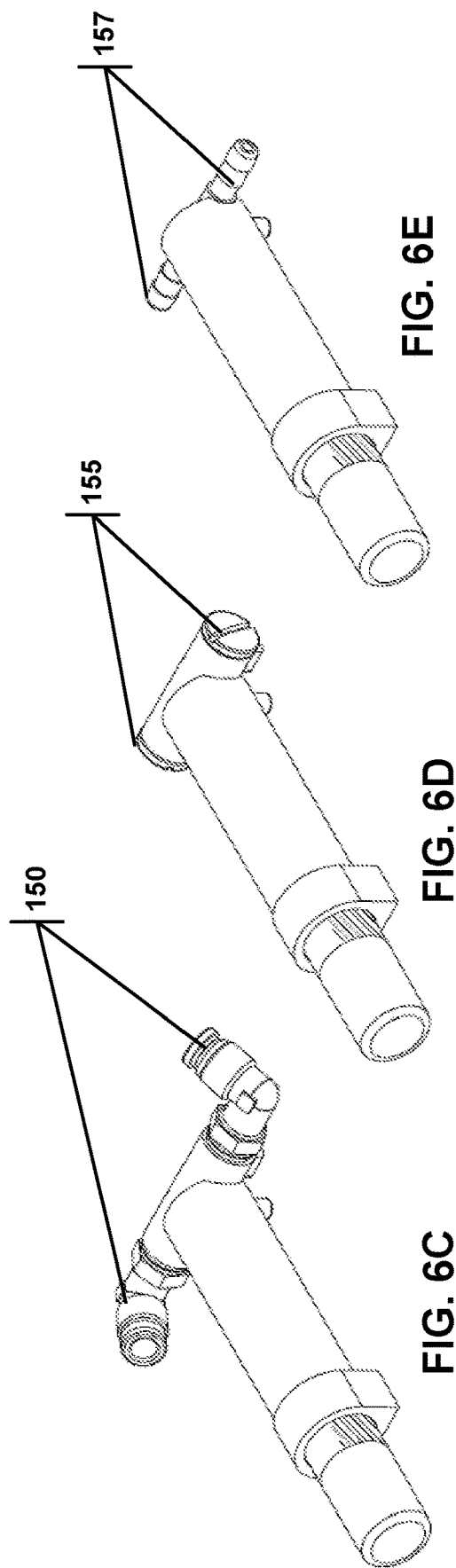
FIG. 6A
FIG. 6B
FIG. 6C
FIG. 6D
FIG. 6E

MULTI-PORT THUMB PUMP SYSTEM

1.0 CROSS-REFERENCE TO RELATED APPLICATIONS

This application claims priority as a non-provisional of U.S. Patent Application No. 62/441,914, entitled U-CUP SEAL IMPROVEMENTS, filed on Jan. 3, 2017, the contents of which is incorporated herein in its entirety.

This application is also related to U.S. Patent Application No. 62/410,692, entitled CUP COVERS, filed on Oct. 20, 2016, U.S. Patent Application No. 62/423,497, entitled SUCTION CUP COVERS, filed on Nov. 11, 2016, and U.S. patent application Ser. No. 15/375,107, entitled SUCTION CUP COVERS, filed on Dec. 11, 2016, and those patent applications are incorporated herein in their entireties.

2.0 FIELD OF THE INVENTION

This invention relates to tools using suction cups. More particularly, this invention relates to improvements to pumps used to pull a vacuum in suction cups.

3.0 BACKGROUND

The demand for solid-surface countertops such as granite, marble, engineered stone, and Corian® has steadily risen over the past decade. As the demand for solid-surface countertops, vanities, tub decks, fireplace mantles and hearths continues to grow, it becomes more imperative for solid-surface fabrication companies to work faster, without sacrificing quality, in order to meet this demand.

In working with solid surfaces, it is often desirable to join two or more pieces of material together. For example, in U.S. Pat. No. D644497 issued on Sep. 6, 2011, a solid-surface seaming apparatus is claimed. FIG. 1A is a drawing from the '497 patent, and the seam-setter apparatus 10 uses two suction cups 15, 25, which are operated by hand pumps 20, 30. The user of this apparatus lays down two pieces of a solid-surface material, and at the edge of each piece applies adhesive. The goal is to bring both pieces together to form a stable, strong and level seam. To do this, the user places the first suction cup 15 on one piece of a solid-surface material and the second suction cup 25 on the second piece of solid-surface material, then the user activate both thumb pumps 20, 30. Once the vacuum is drawn, the user turns the knob 35, mounted on a threaded rod 37, which draws the suction cups 15, 25 linearly closer to each other, thereby closing the seam between the two pieces of the solid-surface material. Then the user turns the leveling knobs (38a, 38b) that are mounted to threaded rods, which push down near the seam until both solid-surface pieces are at the same level. The seam-setter apparatus 10 is left on the two pieces of the solid-surface material until the adhesive cures. Once the user is finished setting the seam, he must release the pressure in each suction cup individually in order to remove the apparatus from the solid surface.

FIGS. 1C and 1D, which is a new design by the same inventor of the present invention, illustrates a suction cup 40 removed from the device. The cup has a port 45 formed into the pliable suction surface 50, wherein the port 45 is connected to the pump, such that the cup can form a vacuum upon activation of the pump. Lifting the pressure release tab 52 away from the solid surface releases the pressure within the suction cup and allows the suction cup to be removed from the solid surface. The suction cup 40 can be attached to the thumb pump by the threaded mounting structure 49 located on the upper port surface 48.

Suction cups can be used to strengthen and carry fragile material. As in the example shown in FIG. 1B, multiple suction cups are connected to a longer frame or rigid beam that keeps fragile material from flexing and/or breaking during transport, installation and general handling. In other examples, the suction cup may be connected to a crane-type apparatus, such that suction can be drawn on the cups and the operator can activate the crane to lift and position the material.

Unfortunately, the prior art design has several problems. Because the thumb pumps all operate independently of each other, it can be difficult and time consuming to operate an apparatus with several thumb pumps. For example, the frame device shown in FIG. 1B can be used to install large solid surface pieces that clad a wall. This is common in commercial building that may have large marble, granite or porcelain veneers that clad more common and less expensive materials. The sold surface pieces do not have bearing strength, rather are used for aesthetics. Often this cladding must be installed several stories up, making installation a potentially dangerous undertaking. Using the prior art apparatus, the installer would place the apparatus on the solid surface and then individually manually pump each thumb pump. Once all the pumps have pulled a vacuum, the apparatus connected to the solid surface and be crane-lifted to the final installation position. The installer would add the binding material to the back side of the solid surface and to the building wall and press the solid surface against the wall until the binding material had cured sufficient to hold the weight of the solid surface. The installer would then lift the pressure release tabs from the suctions cup for each thumb pump individually until the entire apparatus is detached from the solid surface. This is very time consuming because the apparatus may have several thumb pumps. The location of the pressure release tab is not always convenient as they may be rotated, and thus potentially blocked by the frame of the apparatus. Moreover, the apparatus may be several feet long so pumping and pressure releasing each thumb pump individually may require the installer to use a ladder or step stool. When the installation is several stories high on an exterior wall, this can be extremely dangerous.

What is therefore needed is a thumb pump system that overcomes these deficiencies and provides full easy pumping and pressure release.

4.0 SUMMARY

The present invention provides an elegant solution to the needs described above and offers numerous additional benefits and advantages, as will be apparent to persons of skill in the art. A multi-port thumb pump cylinder is disclosed. The cylinder includes a body with a body bore longitudinal axis running along a portion of the length of the body and defining a proximal and distal end. The body central bore receives a thumb pump piston assembly through the proximal end. The body has a vacuum manifold connected to the distal end of the body central bore. The manifold includes a suction cup vacuum port and at least one vacuum port constructed to allow fittings to attach to it.

The fittings can include, but are not limited to, a pressure release valve, a straight fitting, an elbow fitting, a threaded plug and a tube. The vacuum ports can have threading to allow attachment of the fittings. The manifold can have at least two vacuum ports each constructed to allow attachment of fittings. The manifold can have an anti-rotation flat that prevents rotation and damage of the cylinder.

The manifold may have a manifold central bore with a manifold bore longitudinal axis that runs in a direction that is substantially orthogonal to the body bore longitudinal axis. One vacuum port may be located at one end of the manifold bore longitudinal axis and the other vacuum port may be located at the opposite end of the manifold bore longitudinal axis. An anti-rotation flat(s) may be positioned adjacent to each of the at least two vacuum ports.

In yet another embodiment the cylinder can be used in a thumb pump and a thumb pump system with multiple thumb pumps.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

5.0 BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

FIG. 1A is an isometric view of seam setter from U.S. Pat. No. D644497.

FIG. 3A is an isometric view from the port-side of the multi-port thumb pump cylinder of FIG. 2A.

FIG. 3B is an isometric view from the port-side of the multi-port thumb pump cylinder of FIG. 2A rotated from the position shown in FIG. 3A.

FIG. 3C is an isometric view from the port-side of the multi-port thumb pump cylinder of FIG. 2A rotated from the position shown in FIG. 3B.

FIG. 3D is a front isometric view of the multi-port thumb pump cylinder of FIG. 2A.

FIG. 3E is a front isometric view of the multi-port thumb pump cylinder of FIG. 2A rotated from the position shown in FIG. 3D.

FIG. 3F is a front isometric view of the multi-port thumb pump cylinder of FIG. 2A rotated from the position shown in FIG. 3E.

FIG. 5A is a side exploded view of a thumb pump piston assembly.

FIG. 5B is a side view of the thumb pump piston assembly of FIG. 5A.

FIG. 5C is a cross-section of the thumb pump piston assembly taken along line A-A of FIG. 5B.

FIG. 5D is an enlarged portion of FIG. 5C.

FIG. 6A is an isomeric view of a multi-port thumb pump.

FIG. 6B is an isomeric view of a multi-port thumb pump with straight fitting attached to the ports.

FIG. 6C is an isomeric view of a multi-port thumb pump with elbow fitting attached to the ports.

FIG. 6D is an isomeric view of a multi-port thumb pump with threaded plugs attached to the ports.

6E is an isomeric view of a multi-port thumb pump with molded nipples.

Figure 7A:
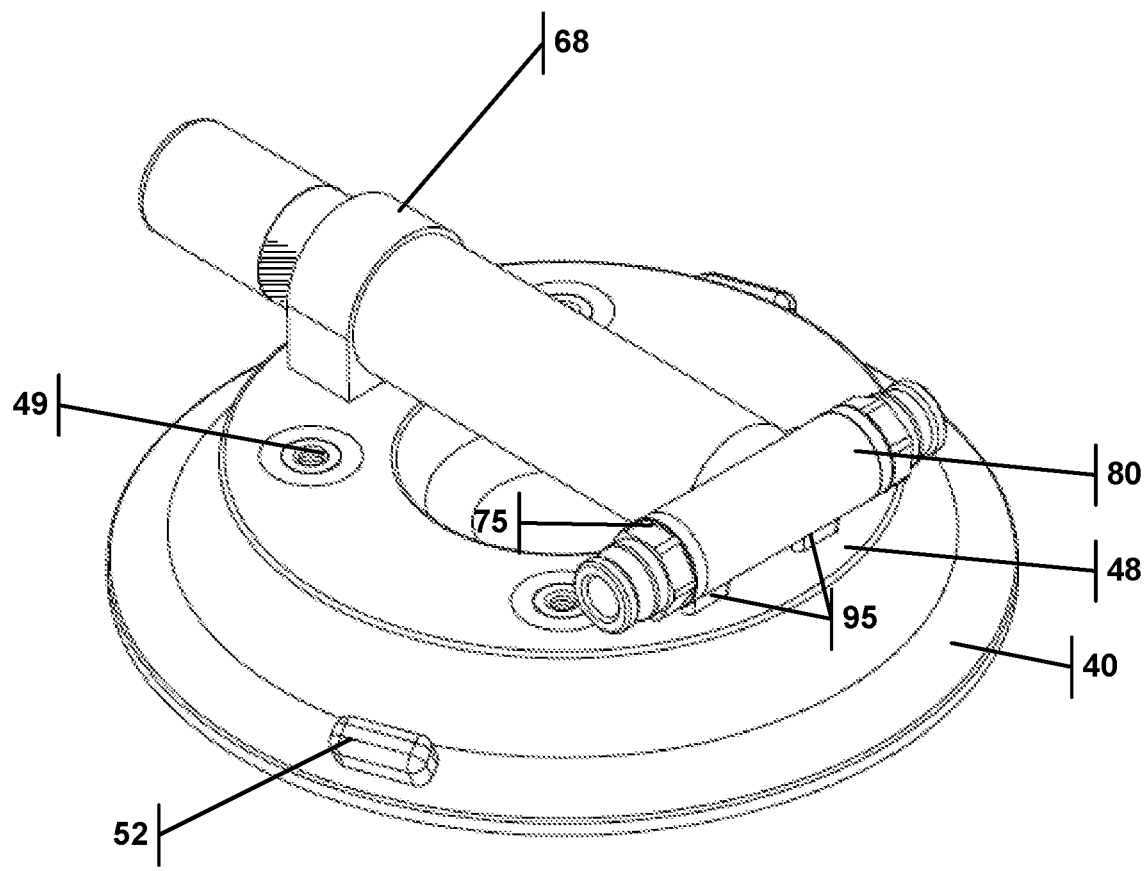

FIG. 7A is an isometric view of a multi-port thumb pump device without a thumb pump securing structure.

Figure 7B:
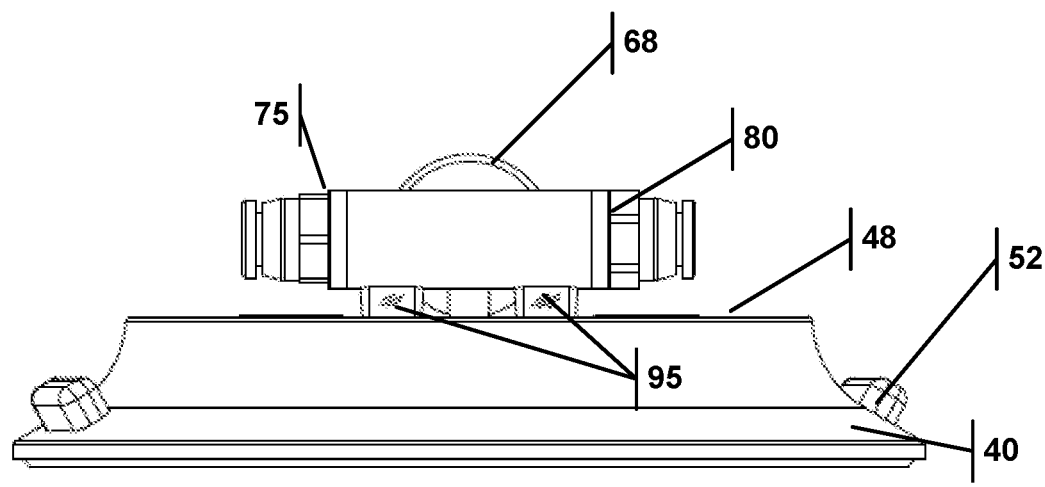

FIG. 7B is a side view of the multi-port thumb pump device without a thumb pump securing structure.

Figure 8A:
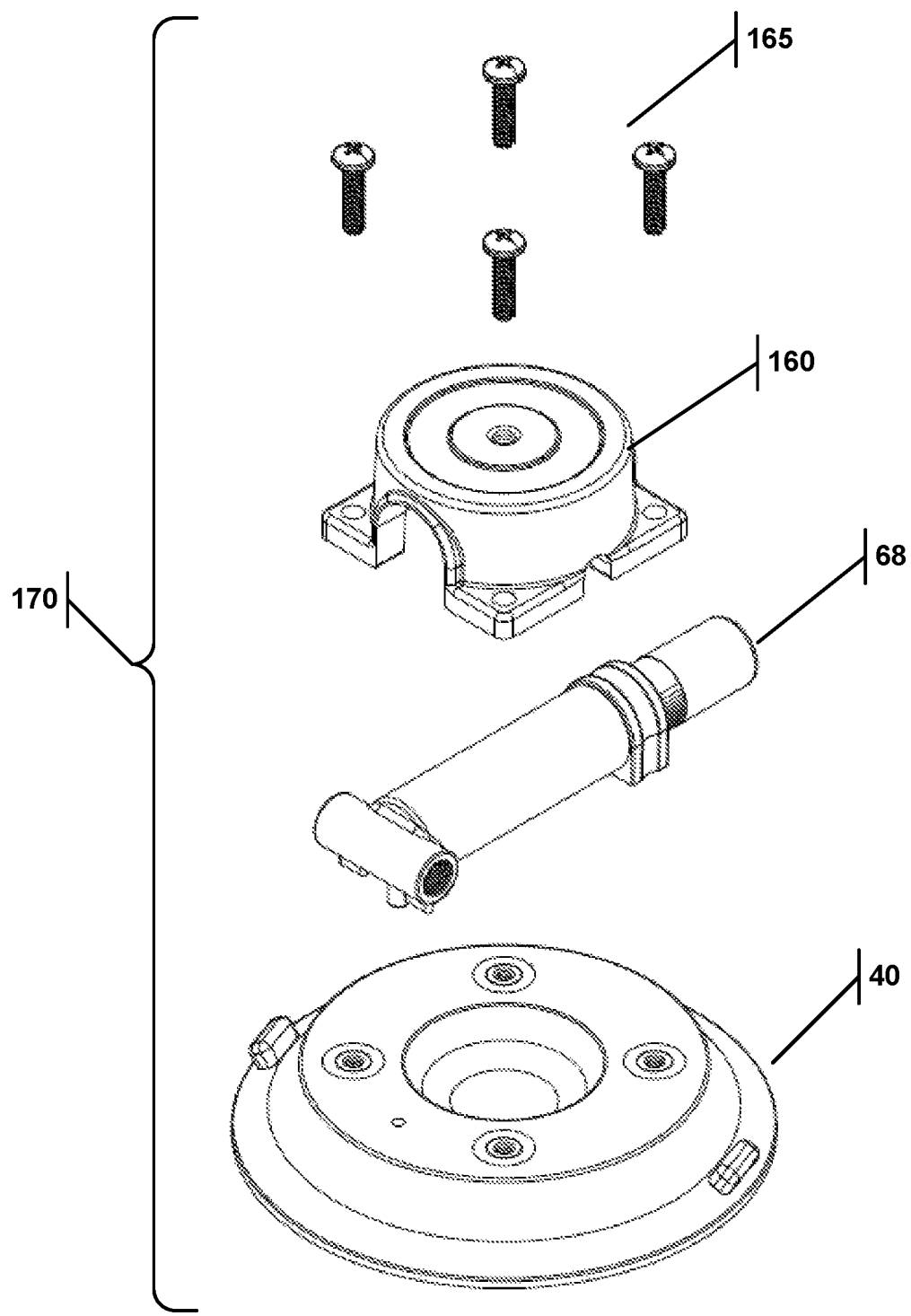

FIG. 8A is an isometric exploded view of a multi-port thumb pump device.

Figure 8B:
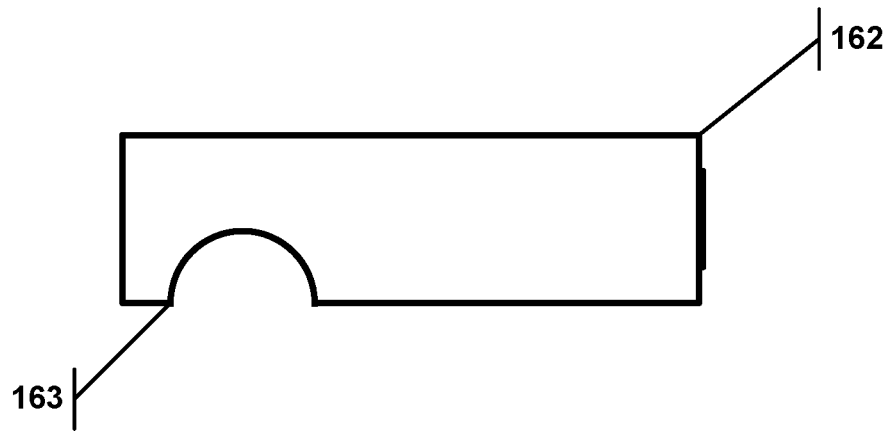

FIG. 8B is a side view of a thumb pump securing structure.

Figure 8C:
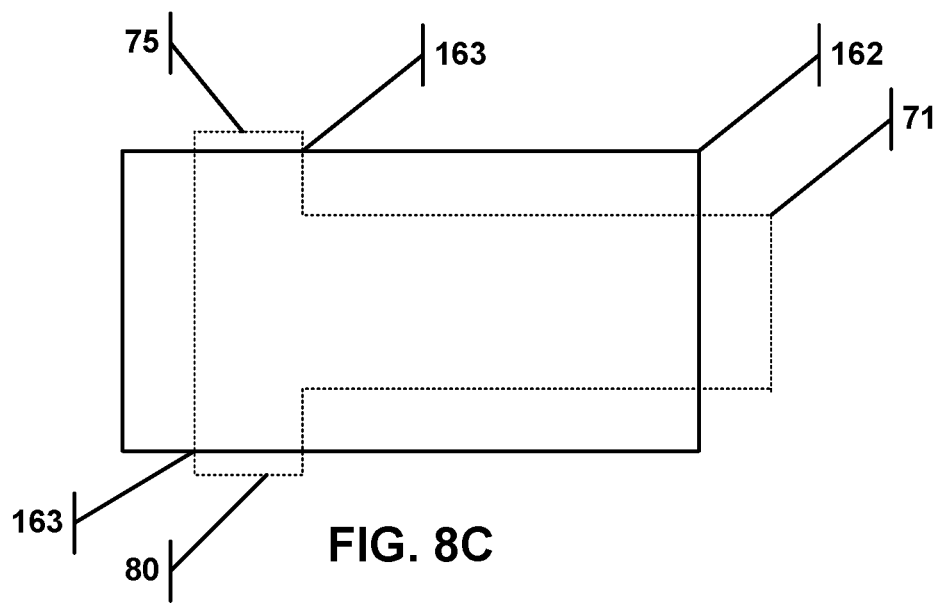

FIG. 8C is a top view of a thumb pump securing structure.

Figure 9A:
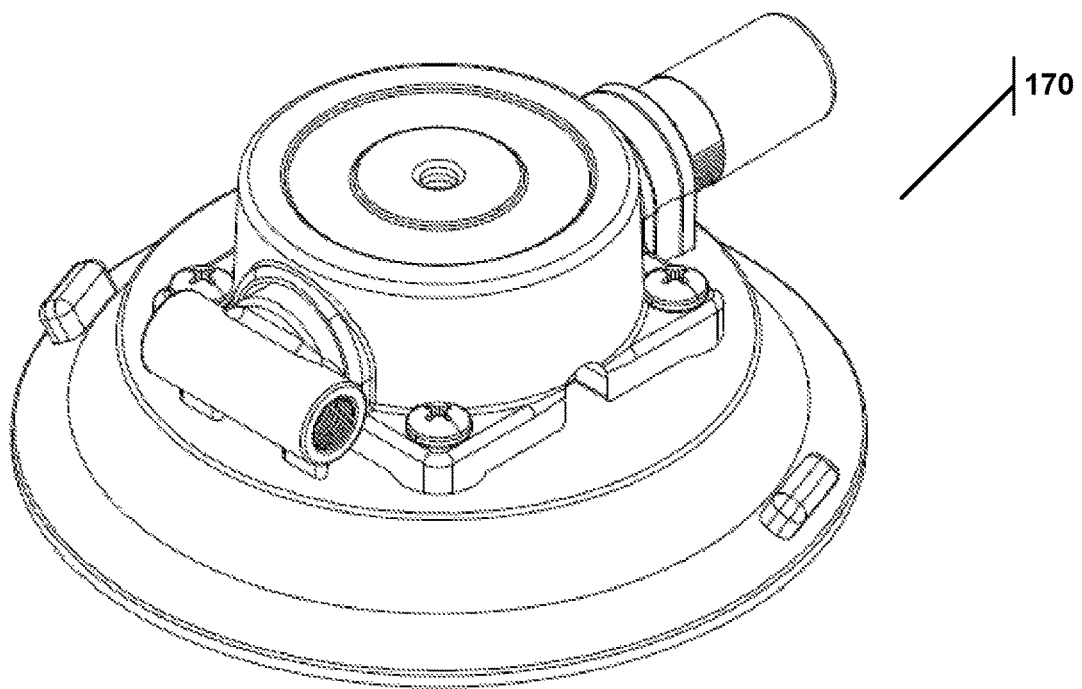

FIG. 9A is an isometric view of an assembled multi-port thumb pump device.

Figure 9B:
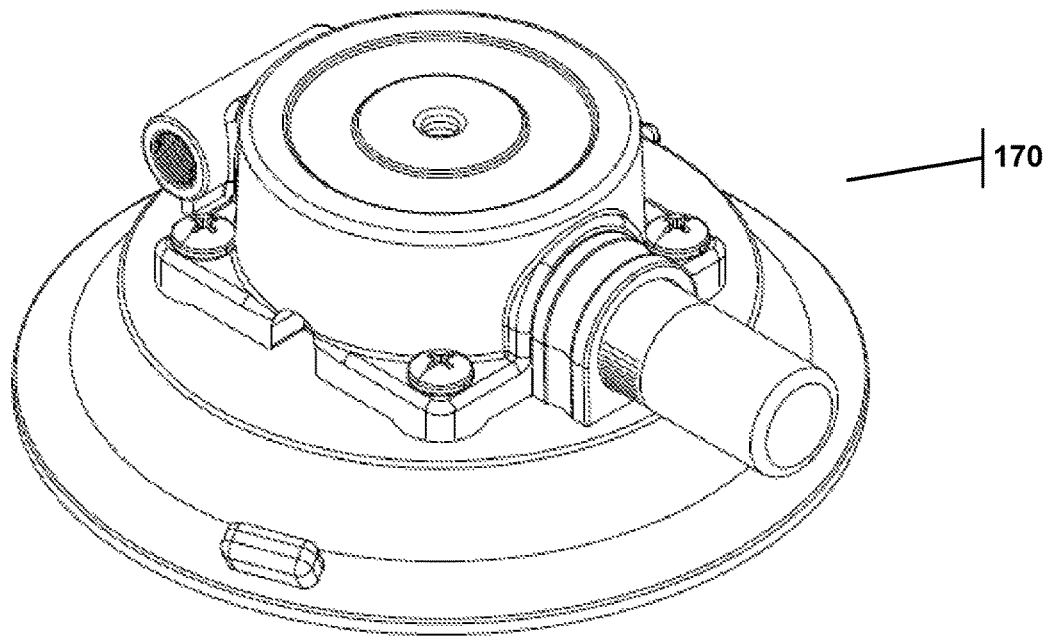

FIG. 9B is an isometric view of an assembled multi-port thumb pump device.

Figure 10A:
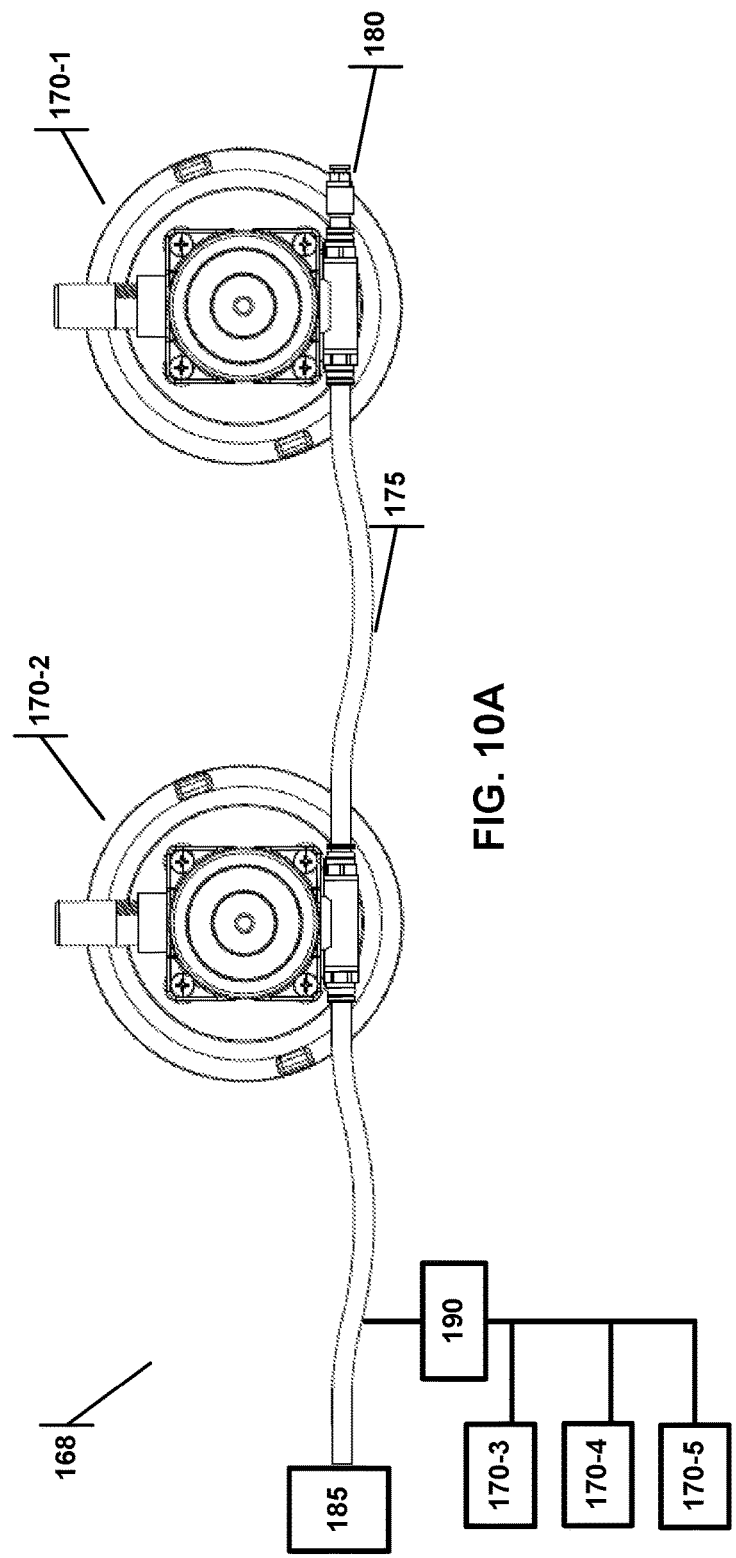

FIG. 10A is a top view of a multi-port thumb pump system.

Figure 10B:
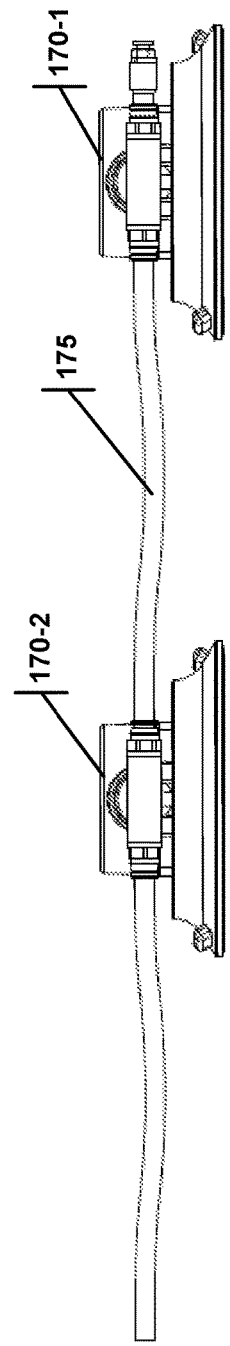

FIG. 10B is a side view of a multi-port thumb pump system.

6.0 DETAILED DESCRIPTION

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with FIGS. 1A-10B and is provided for ease of reference, where like reference numerals designate corresponding features throughout the specification and figures:

Seam setter apparatus 10
First suction cup 15
First thumb pump 20
Second suction cup 25
Second thumb pump 30
Frame 32
Knob 35
Threaded rod 37
Leveling knobs 38*a*, 38*b*
Suction cup 40
Port 45
Upper port surface 48
Threaded mounting structure 49
Pliable suction surface 50
Pressure release tab 52
Single port thumb pump cylinder 55
Suction cup vacuum port/nipple 60
Thumb pump piston assembly 65
Multi-port thumb pump 68
Multi-port thumb pump cylinder 70
Cylinder body 71
Body central bore 72
Body bore longitudinal axis 73
Proximal end 74A
Distal end 74B
First vacuum port 75
First vacuum port connection structure (threading) 77
Second vacuum port 80
Second vacuum port connection structure (threading) 82
Vacuum throat 85
Manifold 90
Manifold central bore 92
Manifold bore longitudinal axis 94
Anti-rotation flats 95
Torque rotation 97
Thumb pump piston 100
Indicator press-on collar 105
Collar bore 107
Second indicator press-on collar 108
Spring 110
Spring retaining washer 115
U-Cup backing washer 120
U-Cup seal 125
U-Cup seal retainer 130
Valve retainer washer 135
One-way valve 140
Straight fitting 145
Elbow fitting 150
Threaded plug 155
Molded nipple 157
Thumb pump securing structure 160
Thumb pump securing structure with anti-rotation vacuum port cut-outs 162
Anti-rotation cutouts 163
Fastener 165
Thumb pump system 168
Multi-port thumb pump device 170
Vacuum tubing 175
Pressure release valve 180
Motorized vacuum pump 185
One-way vacuum retention valve 190

FIGS. 1E through 1K show a prior art single port thumb pump cylinder 55. This cylinder 55 also contains a suction cup vacuum port/nipple 60 that is inserted into the port 45 located on the suction cup 40 (see FIGS. 1E-1D). A thumb pump piston assembly 65 is inserted into the single port thumb pump cylinder 55, which creates a vacuum in the suction cup 40.

FIGS. 2A through 6D illustrate a novel multi-port thumb pump 68 with a multi-port thumb pump cylinder 70. Specifically, the multi-port thumb pump cylinder 70 includes a body 71 with a body central bore 72 that contains a body bore longitudinal axis 73 running along a portion of the length of the body. The axis 73 defines a proximal 74A and distal end 74B and the body central bore 72 is constructed to receive a thumb pump piston assembly 65 through the proximal end 74A. Connected to the distal end 74B of the body central bore 72, and through a vacuum throat 85, is a manifold 90 that has a suction cup vacuum port/nipple 60 and at least one vacuum port, preferably two 75,80, with a molded nipple 157 (see FIG. 6E) or a connection structure (such as threading 77, 82) to allow various fittings to be attached to the at least one vacuum port 75,80. The fittings may include, but are not limited to a pressure release valve 180 (FIG. 10), a straight fitting 145 (FIG. 6B), an elbow fitting 150 (FIG. 6C), a threaded plug 155 (FIG. 6D) a barbed, straight, or tapered tube connector 157 (FIG. 6E), and a tube 175 (FIG. 10A). The connection structure can also be any other common pneumatic connector or device such as a quick connect, or a vacuum gauge, or an electronic vacuum sensor, etc.

The multi-port thumb pump cylinder 70 is designed in a "T" shaped. Namely, the manifold 90 has a manifold central bore 92 with a manifold bore longitudinal axis 94 running in a direction that is substantially orthogonal to the body bore longitudinal axis 73; thus forming the "T" shape design. The first vacuum port 75 may be located at one end of the manifold bore longitudinal axis 92 and the other vacuum port 80 may be located at the opposite end of the manifold bore longitudinal axis 92.

Adjacent to each of the two vacuum ports 75,80 is an anti-rotation flat 95. This flat 95 may be, as shown, two separate structures or may be a single structure. The function of the flat 95 is to prevent the rotation of the cylinder 70 when various fitting are attached to the vacuum ports 75, 80. Installation of the fitting may cause torque in the direction of arrow 97 which could damage the suction cup vacuum port/nipple 60, rendering the entire multi-port thumb pump 68 non-operational. FIGS. 8B and 8C, discussed in detail below, illustrate a unique thumb pump securing structure that also assist in preventing torqueing.

Figure 1A:
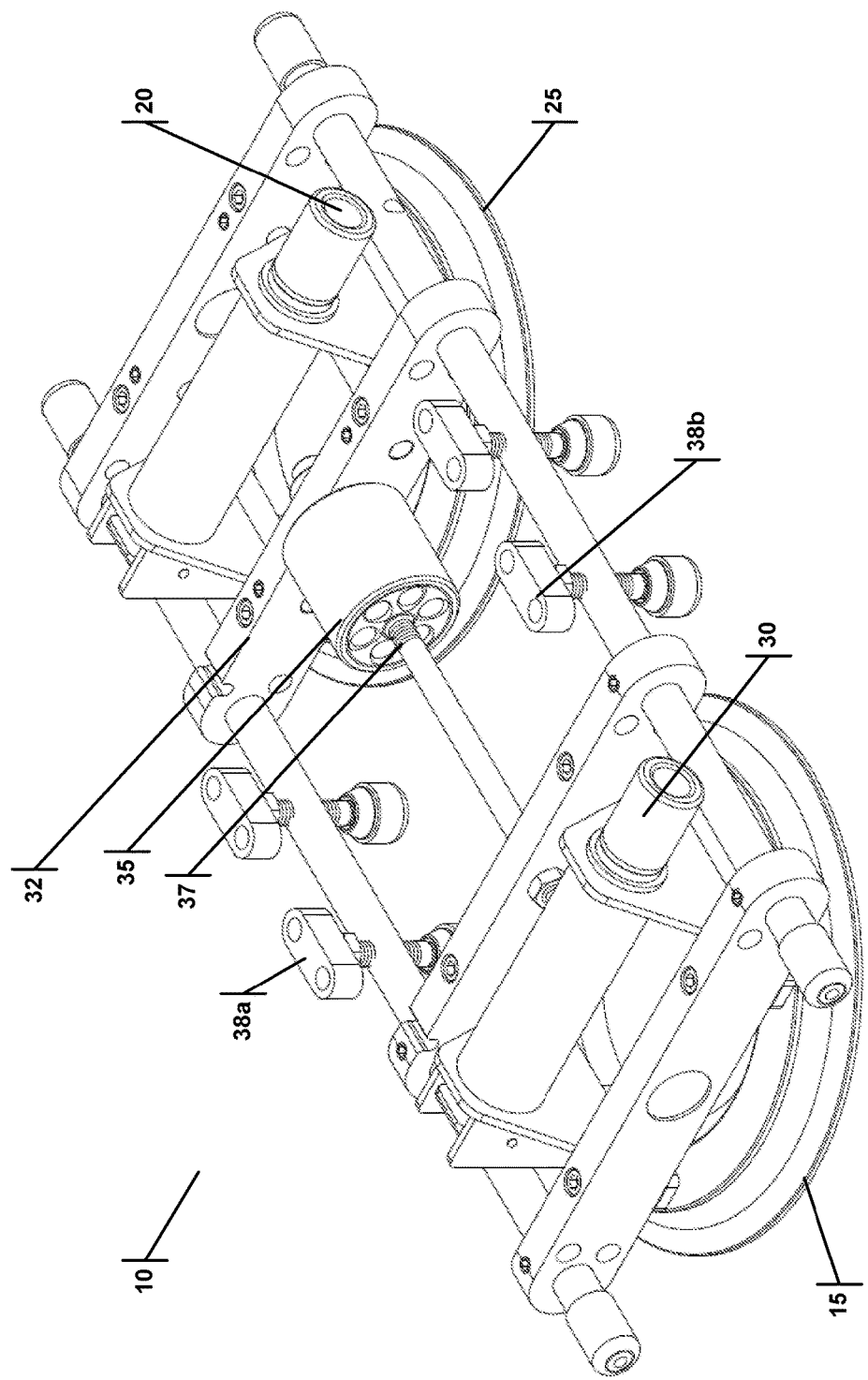
FIG. 1B is an isometric view of several suction cups connected by a frame, wherein the suction cups are attached to a slab of material.
FIG. 1C is an isometric bottom view of a suction cup.
FIG. 1D is an isometric top view of the suction cup of FIG. 1C.
FIG. 1E is an isometric view of a single port thumb pump cylinder.
FIG. 1F is a cross-section of the single port thumb pump cylinder taken along line A-A of FIG. 1E.
FIG. 1G is a front isometric view of the single port thumb pump cylinder of FIG. 1E.
FIG. 1H is a front isometric view of the single port thumb pump cylinder of FIG. 1E rotated from the position shown in FIG. 1G.
FIG. 1I is an isometric view from the port-side of the single port thumb pump cylinder of FIG. 1E.
FIG. 1J is an isometric view from the port-side of the single port thumb pump cylinder of FIG. 1E rotated from the position shown in FIG. 1I.
FIG. 1K is an isometric view from the port-side of the single port thumb pump cylinder of FIG. 1E rotated from the position shown in FIG. 1J.
Figure 1B:
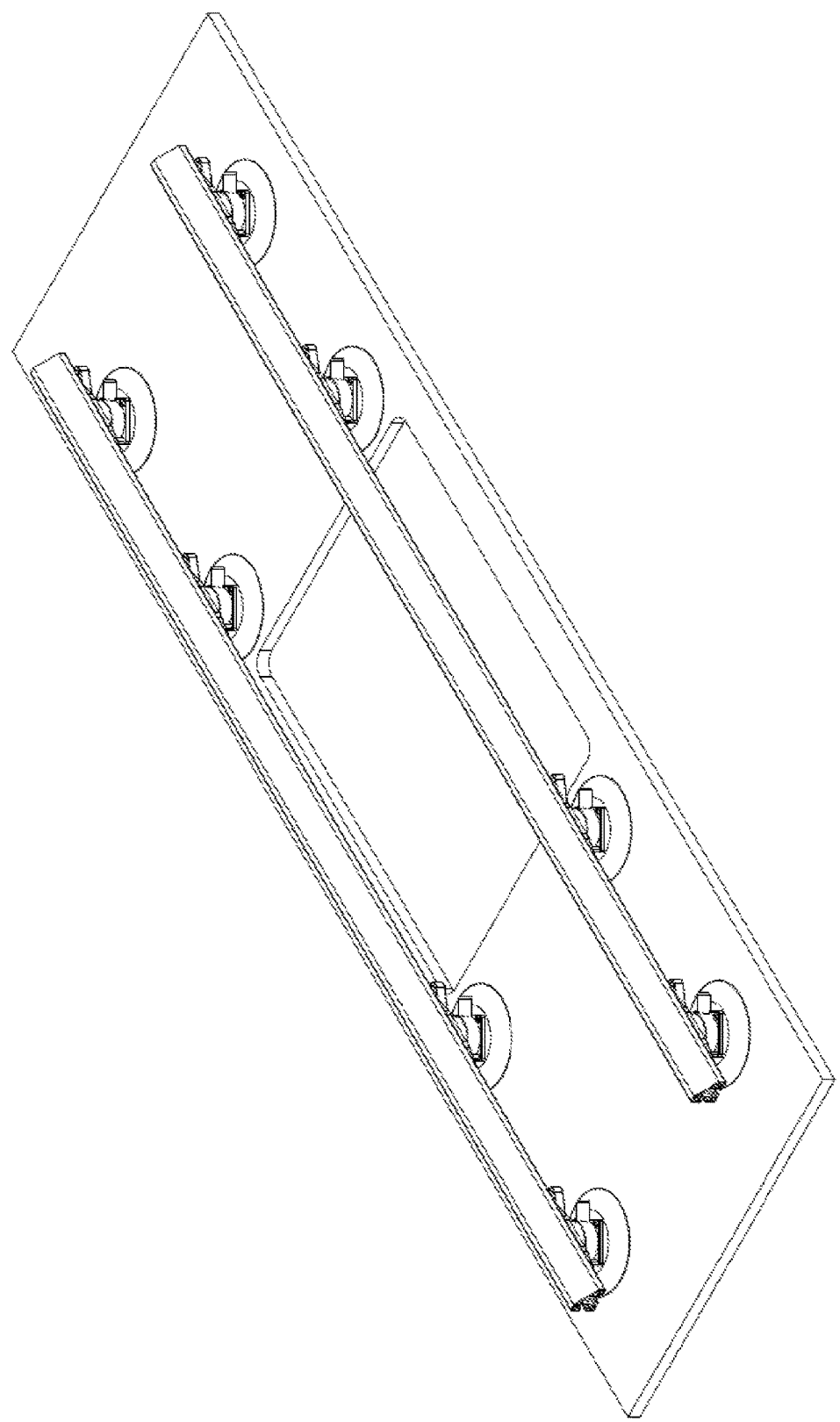
Figure 1C:
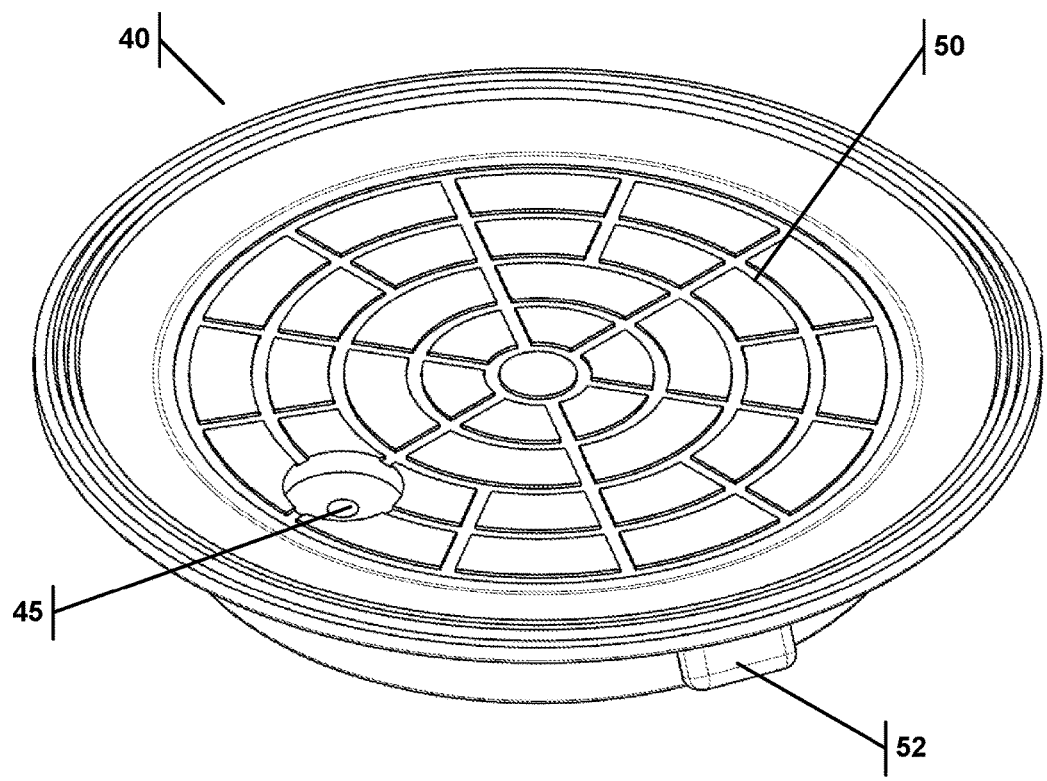
Figure 1D:
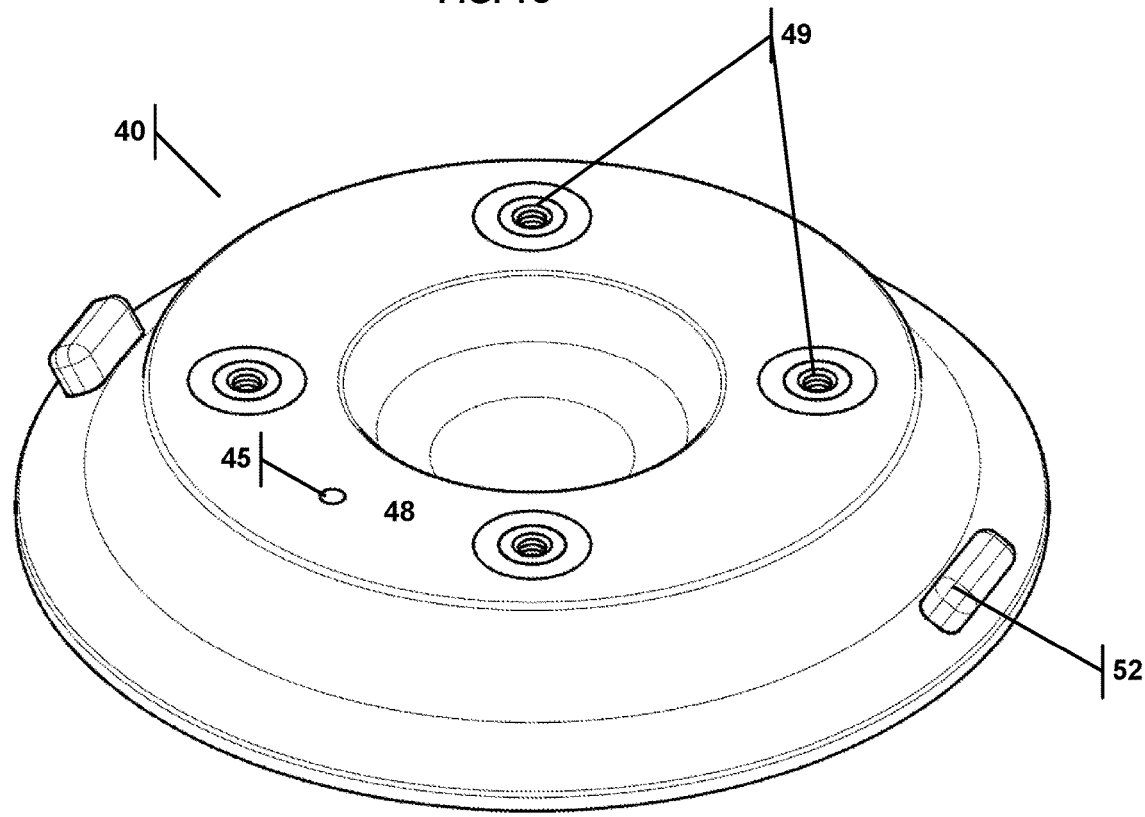
Figure 1E:
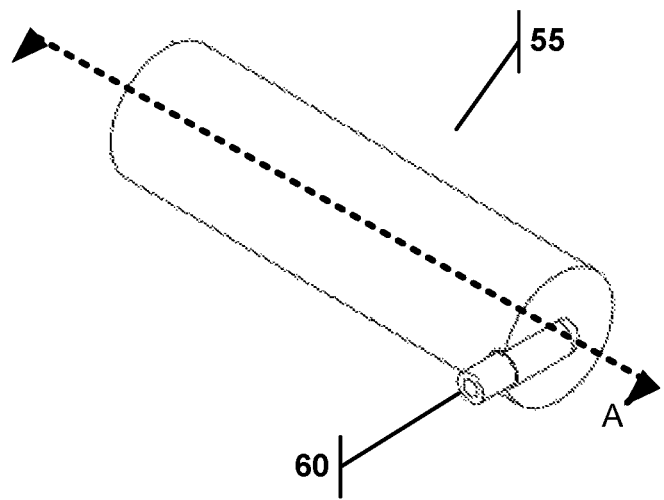
Figure 1F:
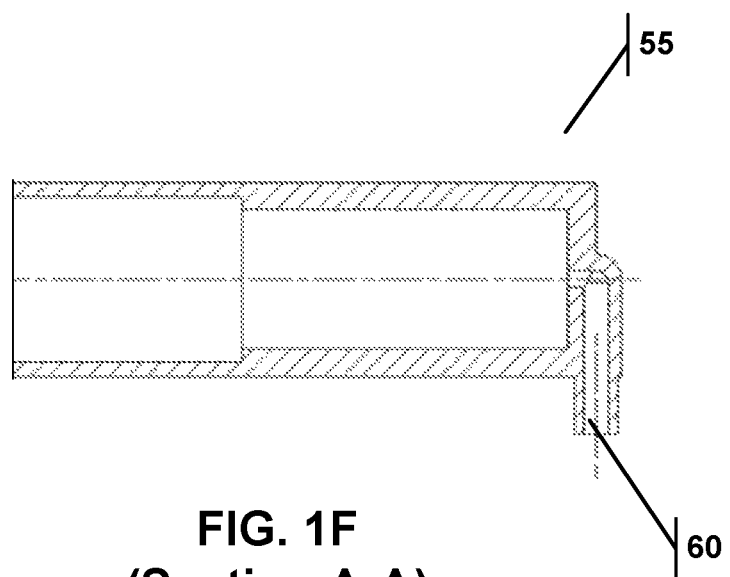
Figure 2A:
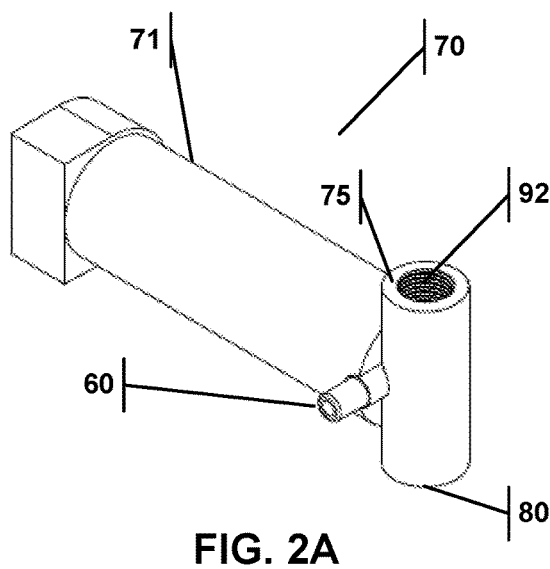
FIG. 2A is an isometric view of a multi-port thumb pump cylinder.
Figure 2B:
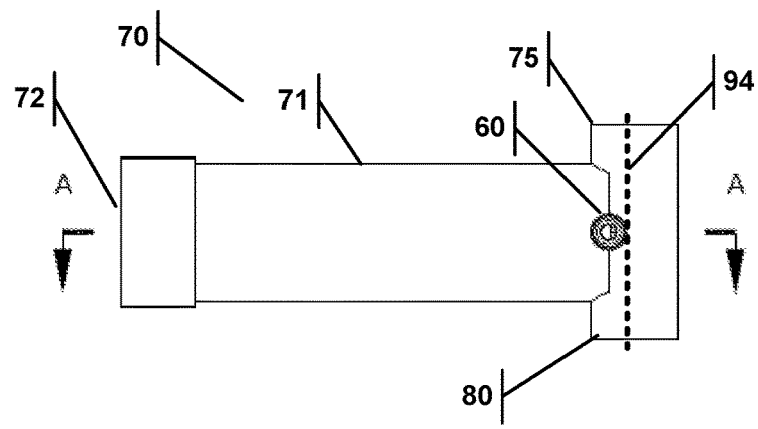
FIG. 2B is bottom view of the multi-port thumb pump cylinder of FIG. 2A.
Figure 2C:
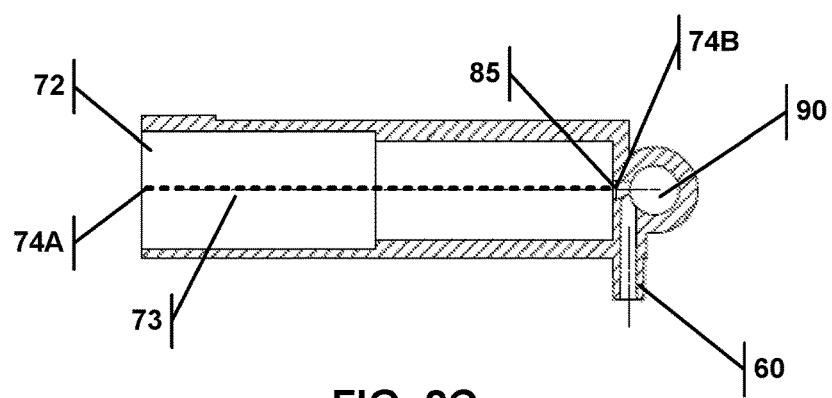
FIG. 2C is a cross-section of the multi-port thumb pump cylinder taken along line A-A of FIG. 2B.
Figure 4:
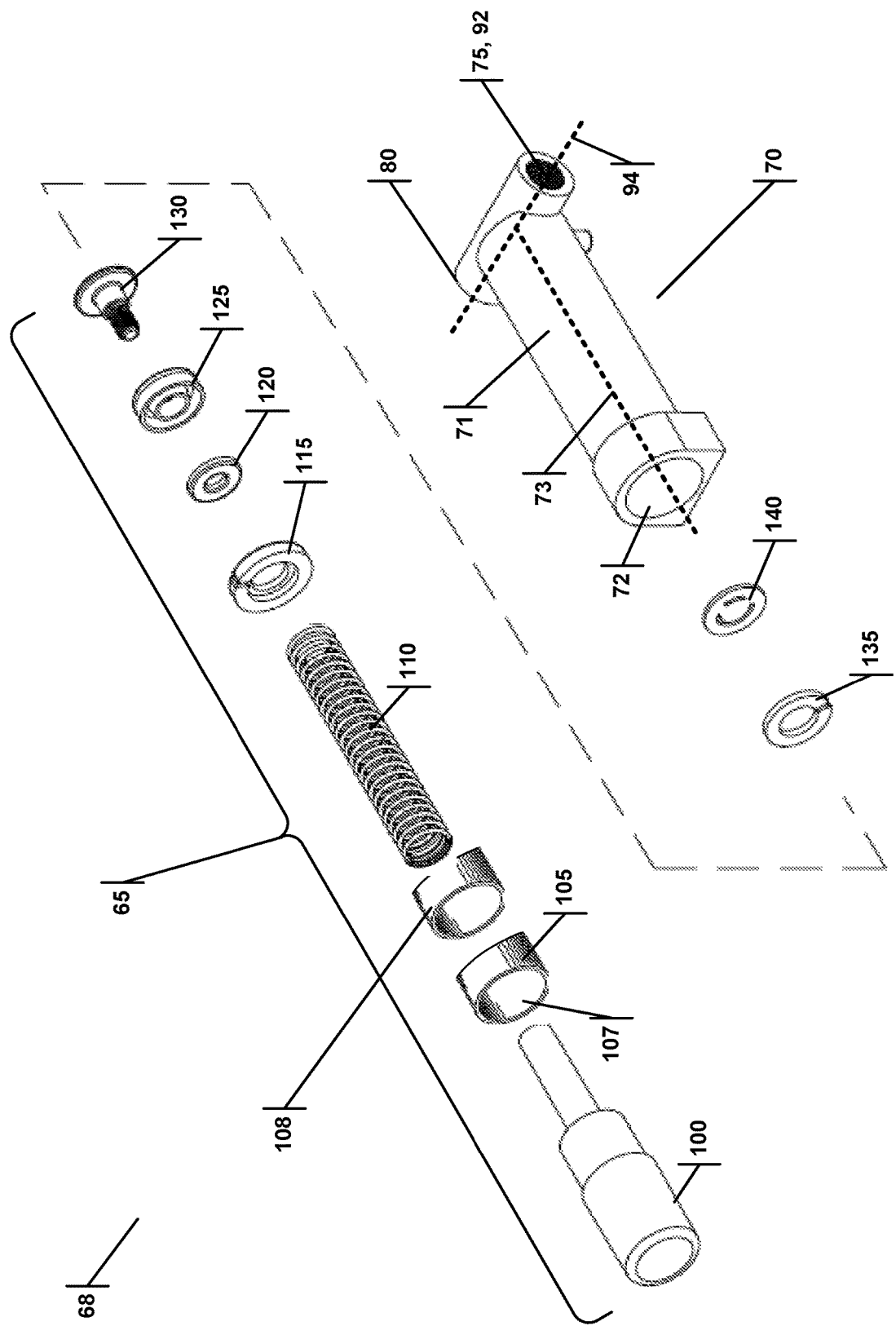
FIG. 4 is an isometric exploded view of a multi-port thumb pump.

FIG. 4 provides an exploded view of the various sub-parts in the multi-port thumb pump 68. The thumb pump piston assembly 65 contains several components: a thumb pump piston 100, an indicator press-on collar 105, a spring 110, a spring retaining washer 115, a U-Cup backing washer 120, a U-Cup seal 125, and a U-Cup seal retainer 130 that may thread into the end of the piston 100. The multi-port thumb pump 68 also has a one-way valve 140 that is retained in place by retainer washer 135. The entire thumb pump piston assembly 65 along with the one-way valve 140 and retainer washer 135 are inserted into the body central bore 72 of the cylinder body 71 of the multi-port thumb pump cylinder 70. The U-Cup seal 125 and the one-way valve 140 form a valve system that draws air from the manifold and creates the vacuum. The inventors of the present application have also developed a new and novel U-Cup seal disclosed in U.S. Patent Application No. 62/441,914, entitled U-CUP SEAL IMPROVEMENTS, filed on Jan. 3, 2017 that may be used with the new multi-port design disclosed herein. The contents of that patent application are incorporated by reference herein in their entirety.

When a thumb pump loses pressure the thumb pump piston begins to push out of the body central bore 72 of the cylinder body 71. Conventional prior art thumb pumps place a painted line onto the thumb pump piston, so that when a user sees the line, the user can determine that the thumb pump has lost vacuum and additional vacuum is needed. The problem with this prior art solution is three-fold. First, painting the indicator is an additional manufacturing step that adds to cost. Second, over time the painted line begins to fade making it indiscernible from the surface it is painted on. Third, the painted on indicator is a binary indicator, with no warning as to how critically low the vacuum pressure may be. When a pump system having several thumb pumps is used, it would be helpful to have an indicator that is not only visible, even in repeated use, but one that gives more information about the current state of vacuum so that a user can attend to the pumps that actually need vacuum and leave those that are still operational alone.

To solve these problems, the indictor press-on collar 105 has a collar bore 107 that allows the collar 105 to be pressed onto the thumb pump piston 100, as show in in greater detail in FIGS. 5A-5C. The collar 105 can be made of a completely different material and/or color from the thumb pump piston 100. Further, several collars may be used each with a different color. For example the thumb pump piston 100 may be formed of a green material, the first indicator collar 105 of a yellow material and the second indicator collar 108 of a red material. Under such a construction, a user would pump the thumb pump piston 100 causing the thumb pump piston to be pushed into the body central bore 72 of the cylinder body 71, deeply enough so that only the green material of the thumb pump piston 100 would be visible. As vacuum is lost, the spring 110 would push the thumb pump piston 100 out of the body central bore 72, exposing the yellow first indicator collar 105. The length of the first indicator collar 105 would be constructed such that it would be exposed when the vacuum pressure was still sufficient to hold the thumb pump to the solid surface material, but approaching a level of vacuum that may cause the pump to dislodge. Upon losing more vacuum, the spring 110 would push the thumb pump piston 100 out of the body central bore 72 even farther exposing the red second indicator collar 108.

The benefit of the multi-port thumb pump 68 may be mounted/attached to a suction cup 40 as shown in FIGS. 7A and 7B. The anti-rotation flats 95 may contact the support port surface 48 of the suction cup 40, preventing the torqueing action describe above that may damage the thumb pump 68. FIG. 8 illustrates an exploded view of a multi-port thumb pump device 170 that includes a multi-port thumb pump 68 attached to a suction cup 40 via a thumb pump securing structure 160 fastened to the suction cup 40 via fasteners 165 threaded into the threaded mounting structure 49 of the suction sup 40. The thumb pump securing structure 160 presses the multi-port thumb pump 68 against the support port surface 48 of the suction cup 40. An assembled multi-port thumb pump device 170 is shown in FIGS. 9A and 9B.

FIG. 8B illustrates a side view of a thumb pump securing structure 162 with anti-rotation cutouts 163 for the vacuum ports 75,80 of the multi-port thumb pump 68. FIG. 8C is a top view of the securing structure with the dashed outline of the cylinder body 71 of the multi-port thumb pump cylinder 70 over which the securing structure 162 is installed. The securing structure 162 helps prevent and minimize torqueing discussed above, that may damage the multi-port thumb pump 68.

FIGS. 10A and 10B illustrate a thumb pump system 168 comprised of a plurality of multi-port thumb pump devices 170-1 through 170-5 pneumatically connected together by vacuum tubing 175. The system 168 may also include a motorized vacuum pump With the construction show in FIGS. 10A and 10B, a user can pump multi-port thumb pump device 170-1, which would draw a vacuum in all the other multi-port thumb pump devices 170-2 through 170-5. Alternatively, the user can pump any of the multi-port thumb pump devices to draw the vacuum. Because the devices are pneumatically connected, releasing the pressure on device 170-1 through pressure release valve 180 would release the pressure for all the devices in the system. As an additional safety feature, the system 168 may have a one-way vacuum retention valve 190 that allows a vacuum to be drawn from devices 170-3 through 170-5 but does not allow air to flow into those devices from pressure release valve 180. This one-way vacuum retention valve 190 allows the system to retain vacuum in some of the devices (170-3, 170-4, 170-5) should there be pump failure on the other side of the valve 190. A second pressure release valve could be used on the device (170-3, 170-4, 170-5) to release the pressure from these devices.

This design solves many of the problems of the prior art. For example, a installer may use a device shown in FIG. 1B with multiple suction cups connected to a longer frame to keep fragile material from flexing and/or breaking during transport, installation and general handling. If the installer uses this type of device with the multi-port thumb pump system 168 comprised of a plurality of multi-port thumb pump devices as described herein, the installer can activate suction by using only a single thumb pump, which is faster and safer as the installer need not move around on the job site which may be perilous. When the material has been properly installed, the installer can simply activate the release valve 180, which would release the entire system, which again is faster and safer. Finally, the installer can look at a single pump to determine if the system is losing pressure because all of the pumps would be pneumatically connected. The installer, therefore, would not have to individually inspect each of the thumb pumps of vacuum, which can be extremely difficult and time consuming.

Although the disclosed multi-port thumb pump has been described with its application to the stone manufacturing and installation industry, the pump is not so limited. By way on non-limiting examples, the multi-port thumb pump may be used for: mounting movie cameras, bike racks, canoe racks, satellite dishes, antennas and other objects to a vehicle, installing/removing/fabricating glass, installing/removing/fabricating solar panels, installing/removing/fabricating of metal panel cladding, installing/removing/fabricating sheet metal, and handling of large LCD/LED displays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus it is to be understood that the description and drawings presented herein represent a presently-preferred embodiment of the invention and are therefore representative of the subject matter which is broadly contemplated by the present invention. It is further understood that the scope of the present invention fully encompasses other embodiments that may become obvious to those skilled in the art, and that the scope of the present invention is accordingly limited by nothing other than the appended claims.

The invention claimed is:

1. A multi-port thumb pump comprising:
a body with a length, the body comprising a body central bore with a body bore longitudinal axis running along a portion of the length of the body and defining a proximal and distal end, the body central bore constructed to receive a thumb pump piston assembly through the proximal end;
the body further comprising a vacuum manifold connected to the distal end of the body central bore, the manifold comprising:
an anti-rotation flat;
a suction cup vacuum port; and
a first accessible vacuum port comprising:
a molded nipple; or
a threaded connection structure to allow fittings to be attached thereto.

2. The pump of claim 1, wherein the fittings are selected from a group consisting of a pressure release valve, a straight fitting, an elbow fitting, a threaded plug and a tube.

3. A multi-port thumb pump comprising:
a body with a length, the body comprising a body central bore with a body bore longitudinal axis running along a portion of the length of the body and defining a proximal and distal end, the body central bore constructed to receive a thumb pump piston assembly through the proximal end, the thumb pump piston assembly constructed to travel along the longitudinal axis within the body central bore;
a seal and a one-way valve constructed to create a vacuum in the central bore as the thumb pump piston assembly travels along the longitudinal axis within the body central bore, and wherein the seal and one-way valve are further constructed to maintain a vacuum irrespective of the position of the thumb pump piston assembly position within the body central bore;
wherein the body further comprises a vacuum manifold connected to the distal end of the body central bore, the manifold comprising:

a suction cup vacuum port;
a first accessible vacuum port; and
a second accessible vacuum port;
wherein the first and second accessible vacuum ports are constructed to allow fittings to be attached thereto.

4. The pump of claim 1, the manifold further comprising a manifold central bore with a manifold bore longitudinal axis running in a direction that is substantially orthogonal to the body bore longitudinal axis.

5. The pump of claim 4, the manifold further comprising a second accessible vacuum port with the first accessible vacuum port located at one end of the manifold bore longitudinal axis and the second accessible vacuum port located at the opposite end of the manifold bore longitudinal axis, the second accessible vacuum port comprising:
a molded nipple; or
a connection structure to allow fittings to be attached thereto.

6. The pump of claim 5, wherein the anti-rotation flat is adjacent to the first and second accessible vacuum ports.

7. A multi-port thumb pump comprising:
a thumb pump piston assembly;
a body with a length, the body comprising a body central bore with a body bore longitudinal axis running along a portion of the length of the body and defining a proximal and distal end, the central bore constructed to receive the thumb pump piston assembly through the proximal end;
the body further comprising a vacuum manifold connected to the distal end of the body central bore, the manifold comprising:
an anti-rotation flat;
a suction cup vacuum port; and
a first and second accessible vacuum ports, each comprising:
a molded nipple; or
a connection structure to allow fittings to be attached thereto.

8. The pump of claim 7, wherein the fittings are selected from a group consisting of a pressure release valve, a straight fitting, an elbow fitting, a threaded plug and a tube.

9. The pump of claim 7, wherein the connection structure comprises threading that allows the fittings to be attached to the accessible vacuum ports.

10. The pump of claim 7, the manifold further comprising:
a manifold central bore with a manifold bore longitudinal axis running in a direction that is substantially orthogonal to the body bore longitudinal axis, wherein the manifold further comprises the first and second accessible vacuum ports with the first accessible vacuum port located at one end of the manifold bore longitudinal axis and the second accessible vacuum port located at the opposite end of the manifold bore longitudinal axis.

11. The pump of claim 10, the manifold further comprising an anti-rotation flat adjacent to the first and second accessible vacuum ports.

12. The pump of claim 7, the thumb pump piston assembly further comprising a thumb pump piston and an indicator collar with a collar central bore, wherein the piston and collar are different colors and the piston is disposed of in the collar central bore.

13. The pump of claim 7, further comprising a pressure release valve.

14. A thumb pump system comprising:
a first and second thumb pump, each comprising:
- a multi-port thumb pump cylinder comprising a suction cup vacuum port and a first vacuum port;
- a thumb pump piston assembly disposed of in the cylinder;
a tube connected to the first vacuum port of each thumb pump;
a first and second suction cup, each comprising a port, wherein the first suction cup is connected to the suction cup vacuum port of the first thumb pump, and the second suction cup is connected to the suction cup vacuum port of the second thumb pump;
wherein when the first and second suction cups are placed on a solid surface and when the first thumb pump is activated, a vacuum is created in both the first and second suction cups.

15. The system of claim 14, the multi-port thumb pump cylinder of the first thumb pump further comprising a second vacuum port, and wherein the first or second vacuum port of the first thumb pump is connected to a plug, a third thumb pump, a motorized vacuum pump, or a pressure release valve.

16. The system of claim 15, the multi-port thumb pump cylinder of the first thumb pump further comprising an anti-rotation flat adjacent to the first and second vacuum ports.

17. The system of claim 14, each thumb pump piston assembly further comprising a thumb pump piston and an indicator collar with a collar central bore, wherein the piston and collar are different colors and the piston is disposed of in the collar central bore.

18. The pump of claim 3, wherein the fittings are selected from a group consisting of a pressure release valve, a straight fitting, an elbow fitting, a threaded plug and a tube.

19. The pump of claim 3, the manifold further comprising a manifold central bore with a manifold bore longitudinal axis running in a direction that is substantially orthogonal to the body bore longitudinal axis.

20. The pump of claim 19, wherein the first accessible vacuum port is located at one end of the manifold bore longitudinal axis, and the second accessible vacuum port is located at the opposite end of the manifold bore longitudinal axis.

21. The pump of claim 3, further comprising an anti-rotation flat.

22. The pump of claim 21, wherein the anti-rotation flat is adjacent to the first and second accessible vacuum ports.

23. The pump of claim 3, the thumb pump piston assembly further comprising a thumb pump piston and an indicator collar with a collar central bore, wherein the piston and collar are different colors, and the piston is disposed of in the collar central bore.

24. The pump of claim 3, further comprising a pressure release valve.

* * * * *